(12) United States Patent
Bhatti et al.

(10) Patent No.: US 9,218,550 B2
(45) Date of Patent: Dec. 22, 2015

(54) METHOD AND SYSTEM FOR CREATING A CUSTOMIZED PRINT

(75) Inventors: Nina Bhatti, Los Altos, CA (US); Henry Harlyn Baker, Los Altos, CA (US); Nathan Moroney, Palo Alto, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/882,180

(22) PCT Filed: Nov. 26, 2010

(86) PCT No.: PCT/US2010/058125
§ 371 (c)(1),
(2), (4) Date: Apr. 29, 2013

(87) PCT Pub. No.: WO2012/071045
PCT Pub. Date: May 31, 2012

(65) Prior Publication Data
US 2013/0235398 A1 Sep. 12, 2013

(51) Int. Cl.
*G06K 15/02* (2006.01)
*H04N 1/60* (2006.01)
*G06K 9/46* (2006.01)

(52) U.S. Cl.
CPC .......... *G06K 15/1802* (2013.01); *G06K 9/4652* (2013.01); *H04N 1/603* (2013.01)

(58) Field of Classification Search
CPC .. G06K 15/1802; G06K 9/4652; H04N 1/603
USPC .............................. 358/1.9, 518; 382/165, 167
See application file for complete search history.

(56) References Cited

U.S. PATENT DOCUMENTS

| | | | |
|---|---|---|---|
| 5,414,537 A * | 5/1995 | Omuro et al. ................. 358/518 |
| 6,421,141 B2 | 7/2002 | Nishikawa | |
| 6,665,095 B1 * | 12/2003 | Janssen et al. ................ 358/2.1 |
| 7,061,503 B2 * | 6/2006 | Newman ....................... 345/593 |
| 7,522,767 B2 * | 4/2009 | Baker et al. .................. 382/167 |
| 7,586,642 B2 * | 9/2009 | Chiba ............................ 358/1.9 |
| 7,594,174 B2 * | 9/2009 | Truelove et al. ............. 715/269 |
| 7,796,299 B1 * | 9/2010 | MacLeod ....................... 358/1.9 |
| 2002/0159083 A1 * | 10/2002 | Arai et al. ...................... 358/1.9 |

(Continued)

FOREIGN PATENT DOCUMENTS

JP 2704590 B2 10/1997
JP 2000-224410 A 8/2000

OTHER PUBLICATIONS

Replacement Drawings of USPGPub. 2006/0232802 (U.S. Appl. No. 11/396,449).*

(Continued)

*Primary Examiner* — Benny Q Tieu
*Assistant Examiner* — Quyen V Ngo
(74) *Attorney, Agent, or Firm* — Pearl Cohen Zedek Latzer LLP (57) ABSTRACT

A method for producing a customized print includes determining a color of at least one feature of an object, where the object is imaged with a reference color chart. A color palette is selected based on the at least one determined feature color and a print is generated based on the selected color palette. A system for producing a customized print is also described.

18 Claims, 6 Drawing Sheets

810 — Determine the color of an object or an object feature

820 — Select a color palette based on the determined color

830 — Create a customized print incorporating the selected palette

(56) References Cited

U.S. PATENT DOCUMENTS

| | | |
|---|---|---|
| 2003/0133044 A1 | 7/2003 | Akiyama et al. |
| 2006/0001677 A1* | 1/2006 | Webb et al. .................. 345/594 |
| 2006/0034509 A1 | 2/2006 | Lu et al. |
| 2006/0232802 A1* | 10/2006 | Gray et al. .................... 358/1.9 |
| 2007/0146754 A1 | 6/2007 | Chang |
| 2012/0099788 A1* | 4/2012 | Bhatti et al. .................. 382/167 |
| 2012/0263379 A1* | 10/2012 | Bhatti et al. .................. 382/167 |

OTHER PUBLICATIONS

ISR in PCT counterpart patent application PCT/US2010/058125, dated Aug. 18, 2011.

* cited by examiner

METHOD AND SYSTEM FOR CREATING A CUSTOMIZED PRINT

BACKGROUND

When at home or out shopping, it may be helpful to match colors or textures of objects at home or in a store with different finishes or paint or apparel colors. A consumer may be able to take a digital picture of the object, especially because of the omnipresence of digital cameras and their integration into cell phones, but the limitations of the camera or the lighting may produce inaccurate object colors and thus inaccurate color sensing. People often have difficulty remembering colors, so in situ measurement of object color can assist in home or office interior or exterior decoration or in selecting apparel and other items that require color accuracy and judgment.

Once an accurate color is available, however, there are often many choices from which a consumer may select regarding the ways in which to use it in decorating or fashion, for example, but consumers may not have the expertise or information to make such choices.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used in a variety of applications. Although the present invention is not limited in this respect, the techniques disclosed herein may be used in or with cameras and other imaging devices, cell phones, personal digital assistants (PDAs), mobile applications, laptop and PC computers, web-based imaging services, kiosk-based services, scanners, inkjet and laser printers, photo printers, multi-function printers, copiers, presses, and the like.

Judging colors and matching them to objects may be desired in an interior or exterior decoration or fashion or apparel situation. For example, a homeowner may desire to paint a room that contains an object, such as a piece of furniture, a rug, a painting, etc., having a specific color or finish, and may want to match the paint to that specific color or finish. Sometimes the object has multiple colors or textures or aspects (collectively called "features") that the homeowner desires to match. Similarly, a consumer may desire to choose clothes that match the color or colors or features of an accessory or choose an accessory that matches the colors or features of the clothes. In the decoration example, if the object is a rug, it is inconvenient to bring the rug to a store to shop for paint or matching items. Taking a picture of the object allows a person to try to match the color, texture, or finish in the store, but it is difficult to accurately assign a color from a digital image, even if the camera has been previously calibrated. Moreover, once a color has been accurately assigned, it is difficult to select products that coordinate with the object or item whose color is being matched, especially since there may be thousands of colors and palettes from which to choose. Embodiments of the present invention allow a user to take a feature of an object, image the object or feature, measure the feature's color, match the color to a paint or palette, and then use the palette to choose customized decorating or apparel solutions.

The color measurement and matching may be performed by imaging the object (or a feature of the object) along with a calibrated reference color chart (or reference color set), correcting the color of the object (or object feature) based on the differences between the imaged reference chart and the actual reference chart, and then choosing a color palette to complement the corrected color. In one implementation the color of an object (or a feature of the object) may be measured by using a device and then the measured color value may be used to choose a complementary color palette. The selected palette or palettes may then be used to provide a customized print, including layout, artwork, and text, that shows the user how to coordinate the color and palette with other objects.

Figures 1, 2:
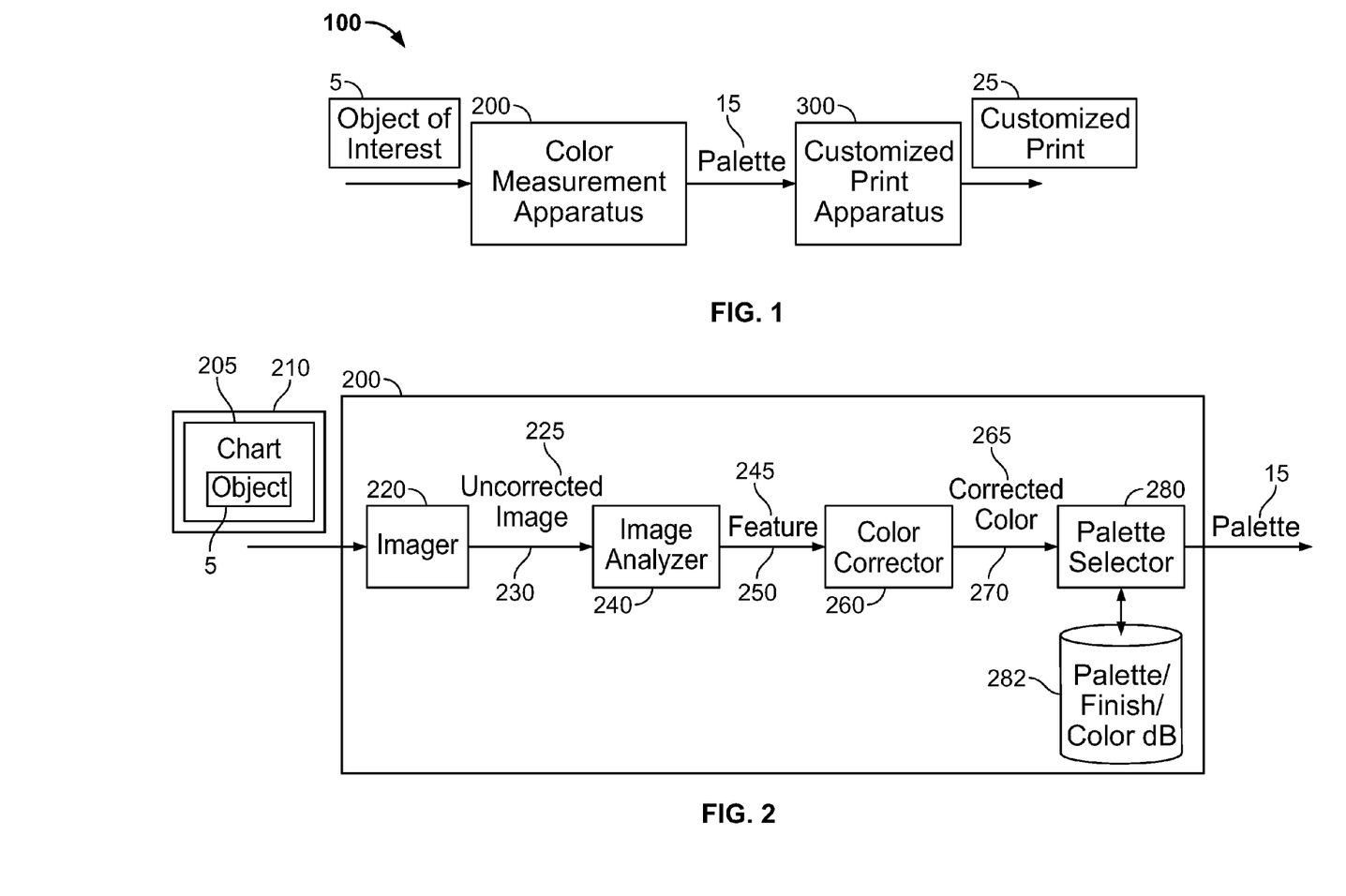
FIG. 1 is a conceptual block diagram of a system for creating a customized color print according to embodiments of the invention.
FIG. 2 is a conceptual block diagram of the color measurement apparatus of FIG. 1 according to embodiments of the invention.

Reference is now made to FIG. 1, which is a conceptual block diagram of a system 100 for creating a customized color print according to embodiments of the invention. System 100 takes an object of interest 5 and produces a customized print 25, such as a brochure or handout, which may help a user to coordinate the object in a decorating or fashion or other situation. System 100 may include color measurement apparatus 200 and customized print apparatus 300. Color measurement apparatus 200 may take object 5 and produce color palette 15. Customized print apparatus 300 may then take color palette 15 and produce customized print 25.

Figure 3:
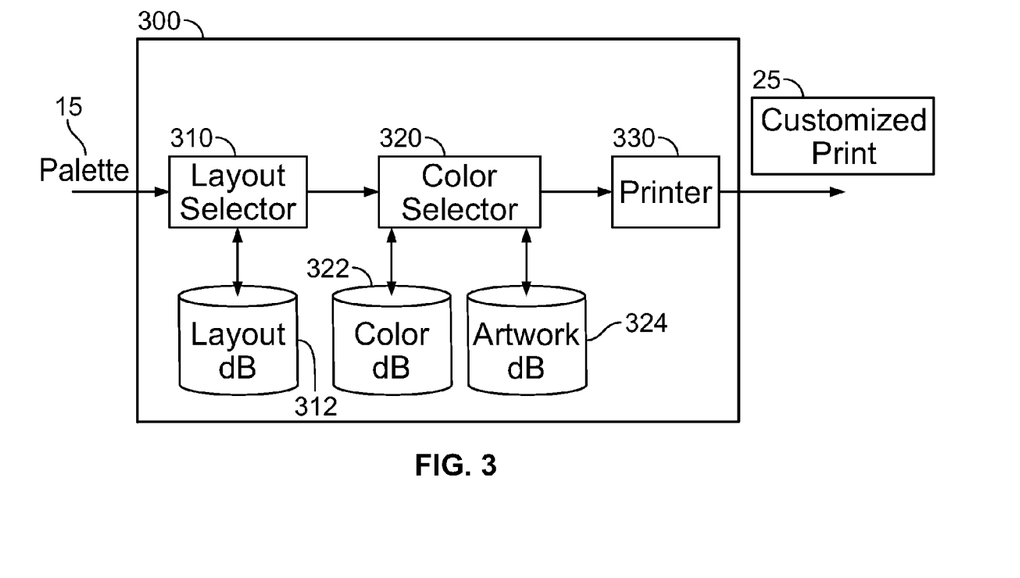
FIG. 3 is a conceptual block diagram of the customized print apparatus of FIG. 1 according to embodiments of the invention.

FIGS. 2 and 3 are conceptual block diagrams of color measurement apparatus 200 and customized print apparatus 300, respectively, of FIG. 1 according to embodiments of the invention. Color measurement apparatus 200 takes as input scene 210, which may be made up of object 5 and reference chart 205, and outputs color palette 15. Color measurement apparatus 200 may include imager (or imaging apparatus) 220, image analyzer 240, color corrector 260, and palette selector 280. Customized print apparatus 300 may include layout selector 310, color selector 320, and printer 330, along with layout database 312, color database 322, and artwork database 324.

Imager (or imaging apparatus) 220 may be a digital camera (high or low resolution), a digital scanner to scan a photograph, a video camera, a copy machine, an all-in-one printer, or a webcam, just to name a few examples of imagers. Imager 220 may image scene 210 to create uncorrected image 225.

As mentioned above, scene 210 may be made up of object 5 and reference chart 205. An example of reference chart 205, shown in FIG. 4, may contain 16 color patches, 401-416, with a cutout area 450 in the middle for object of interest 5. Several arrangements of charts may be possible. For instance, to attempt to match very closely the color of interest, a group of charts may be available, each one centered around a general hue, such as blue, red, green, etc., and there may be several to ten charts from which a user may choose. In such a multi-chart arrangement, the patches in each of the charts may come from secondary hues related to the general hue of the chart and distributed to cover a good range of chroma and lightness. The patches may also be specific colors extracted from a database, such as palette/finish/color database 282 (FIG. 2, and described in more detail below). The range of colors of two adjacent charts may overlap. Charts may be ordered by similar hues to facilitate their use. Since hue is the most natural attribute of color, it makes the choice of the chart by visual matching much simpler for a user. Also, overlapping hues avoids having an object whose color may be in between charts. One or more charts in the group could consist of 16 color samples from palette/finish/color database 282 covering a variety of beiges and browns, colors that are common in home décor and may call for a finer sampling. For other applications, such as apparel or fashion, a different set of charts may be used so as to cover the colors and shades more prevalent in those applications.

As an alternative to a multi-chart group, a single chart having a number of color patches may be used, and the patches can be strategically chosen to cover the color spectrum. This would eliminate the effort of the user to choose from among different charts, but there may be some cost in accuracy.

Figure 4:
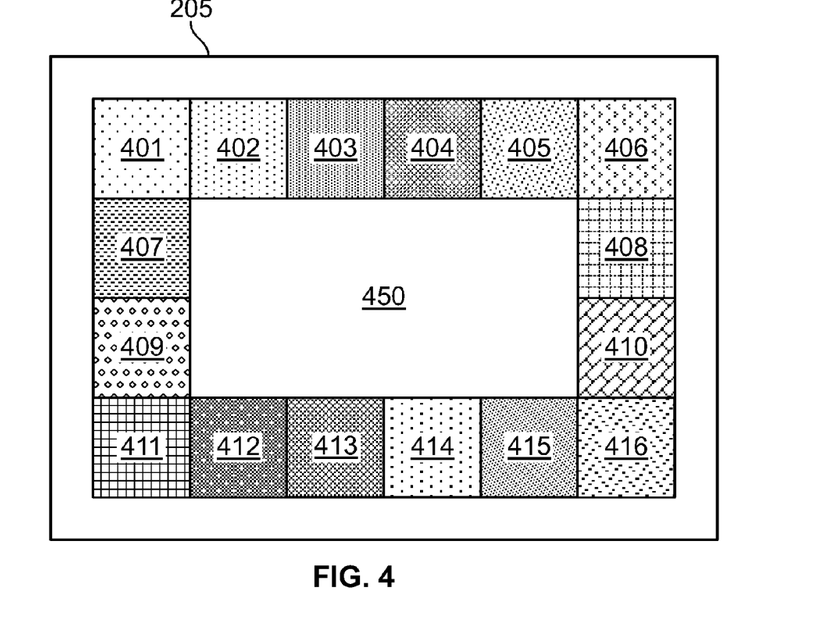
FIG. 4 is a conceptual illustration of a reference color chart according to embodiments of the invention.

There are many configurations possible for reference chart 205 other than 16 color patches surrounding a rectangular cut-out. The shape does not have to be rectangular and the cut out is simply to define a region of the sample. This can be in any region, but should be identifiable by a computer vision area selection algorithm. Also, the chart shape, cut-out shape, and surrounding color arrangement may vary according to the artwork and style of the brand of the finished customized brochure 25. Moreover, charts may be printed on matte paper, so that they are lambertian. Then the reflectance spectrum of each patch can be measured.

Once scene 210 is imaged by imager 220 to generate uncorrected image 225, uncorrected image 225 may be transmitted to image analyzer 240 over a connection 230, and image analyzer 240 may provide feature 245 to color corrector 260 over a connection 250. Connections 230, 250 could be physically close connections, and be wired or wireless, for example, if imager 220, image analyzer 240, and color corrector 260 are contained within a computer, a PDA, a mobile phone, or printing system, such as a scanner/printer or scanner/copier or other system or device. Alternatively, connections 230, 250 may be more distant connections, which may include a telephone (e.g., cellular, public switched, etc.) network and/or a computer network, such as a LAN (local area network), a WAN (wide area network), or the Internet. Connections 230, 250 could also include a file transfer system, such as a portable file system such as a CD, DVD, or thumb or flash drive, which contains uncorrected image 225 or feature 245 which is then input to image analyzer 240 or color corrector 260.

Image analyzer 240 may look at uncorrected image 225 and determine different features of uncorrected image 225 that may be chosen for color correction. For example, an object may have many colors, textures, patterns, or finishes, and image analyzer 240 may identify each one and provide each to color corrector 260 for color correction and then to palette selector 280 for palette selection. Textiles may have a weaving pattern and varying colors, mosaics could have different colors or finishes, and paintings or tapestries may have different colors, textures, or patterns. Image analyzer 240 may offer the user the chance to select one or more features to match, such as by identifying a feature with a box that the user can select. An example could be a tapestry having a texture, a pattern, and a background color and showing different scenes using different colors, and image analyzer 240 may identify for matching the texture, the pattern, the background color, and/or colors from different scenes. In another example, a flower could be depicted in a painting, and image analyzer 240 could identify the color or texture of the stem, petal, or center for matching. The scale of which to consider a pattern could also be identified by image analyzer 240. The scale definition may allow the pattern to be pulled out or blended. Depending on the interior design application the pattern may "read" as a specific figure or it can "read" as a blended figure with the color values of the pattern mixed together. In a further example, image analyzer 240 could identify all the colors within uncorrected image 225 and prepare a histogram, from which the user can choose which colors he or she wants to match.

In one embodiment, the palette may be determined by the colors of multiple features of an object or objects. Multiple items in an image can be analyzed and a palette may corporate one or more of the colors of these features. Multiples and subsets are possible. For example, a vase containing flowers may have multiple objects and colors that could be used to determine the palette of interest that combines these. Or perhaps a shirt and pants may be used to determine the color palette for a matching tie. Conversely, using a tie having multiple colors (e.g., three), an embodiment of the invention may determine a palette of interest for what other items (shirt and pants) to wear with the tie that will combine these three colors.

In other embodiments, a user may want to match the overall color of an object, in which case image analyzer 240 may not be used at all, and uncorrected image 225 could be input directly to color corrector 260 for matching the average color of object 5.

Color corrector 260 may take as an input feature 245 (or uncorrected image 225 if there is no image analyzer 240) via connection 250 and produce corrected color 265 based on a color found in feature 245, using various correction algorithms. Corrected color 265 may then be input via connection 270 to palette selector 280, which may produce color palette 15, using palette/finish/color database 282, which may be a database or databases of finishes, paints, colors, and color coordinated palettes designed by an interior designer or other expert.

A palette can be a tuple of paint colors or textiles, etc. It may be produced by a décor or apparel expert and may be updated seasonally and/or annually as in the fashion industry. A palette can be a set of colors, $p_k = \{c_{k,1}, c_{k,2}, c_{k,3}, \ldots, c_{k,n}\}$, selected for their balanced and pleasing combination. Palettes may also include primary and secondary color harmonies. If $c_s$ is, for example, the sample color, from palette/finish/color database 282 may be found the palette $p_i$ with the minimum [color_difference ($c_s$, $c_{i,j}$)] over the set of all given palettes. This method may find a number of potentially good palettes for the consumer.

Figure 5:
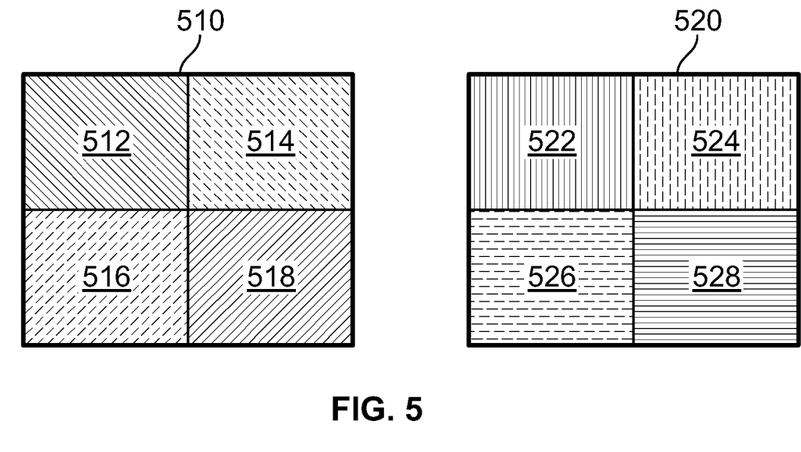
FIG. 5 is a conceptual illustration of color palettes according to embodiments of the invention.

The output of color measurement apparatus 200 may be a set of colors coordinated with the color of the imaged object or features within the object. The colors may be paints or finishes in a home décor application, or fabric colors in an apparel application. Palette/finish/color database 282 may consist of palettes of four colors; two examples of palettes are shown in FIG. 5. When the color $c_s$ of the object or feature is determined, that color is found among the color palettes, and the palette containing that determined color is output as palette 15. For example, color palette 510 may include colors 512, 514, 516, 518, which could be RGB(122,112,191), RGB(185,185,209), RGB(248,220,210), and RGB(243,237,221), respectively. Color palette 520 may include colors 522, 524, 526, 528, which could be RGB(219,228,106), RGB(244,246,205), RGB(255,219,183), and RGB(225,138,39), respectively. The sampled color $c_s$ in a first object may match (or be close to) color 512 in color palette 510, in which case color palette 510 would be selected as palette 15. Similarly, the sampled color $c_s$ in a second object may match (or be close to) color 528 in color palette 520, in which case color palette 520 would be selected as palette 15. Although FIG. 5 shows palettes with four colors, palettes having more or less than four colors can also be used.

In embodiments of the present invention, colors do not need to be exactly matched. Rather, the closest matching shade in a color palette can be selected. The palette is the basis for the color coordination recommendation by the system.

Although color corrector 260 may be described above as correcting a single color and creating a single color palette 15, more than one color in object 5 may be corrected, and thus more than one color palette may be selected to give a user a choice.

As an alternative to the scheme shown in FIG. 2, there may be a two-step process for color correction and palette selection. In this alternative, a rough match to the imaged color may be made based on the color patches in the reference color chart 205, followed by a finer match in color and gloss/texture based on result of the rough match. For example, a first chart may have a wide variety of color patches for calibration of the measured sample patch. This variety of colors may include sample colors spread throughout the color gamut. Based on the measured result from this first step, a second chart may be used with the wide variety of color patches now centered around the first measurement color. A range of charts can be used for finer evaluation of the color values. Several iterations of this process may be performed for a predetermined number of times, or until the color patches themselves can not be distinguished by the imaging device—i.e., the differences in color values is so small that the imaging sensor is not capable of detecting the difference.

FIG. 3 is a conceptual block diagram of customized print apparatus 300 of FIG. 1 according to embodiments of the invention. Customized print apparatus 300 may include layout selector 310, color selector 320, and printer 330, and takes as input color palette 15 to produce customized print 25. As described above, more than one color palette 15 may be selected, but for ease of understanding, the description below refers to a single color palette. Using the selection, a custom brochure can be created using artwork and paint (or other décor product) selections. This greatly narrows the selection for the user and may provide the user with a whole ensemble of colors, not just a single close match. The palette can include a base color, trim, contrasts, etc. The artwork featured in the brochure may also help the consumer visualize the palette.

More specifically, once color palette 15 (or multiple palettes 15) is selected to match the color in the object, layout selector 310 may cull from a layout database 312 one or more pre-arranged layouts. A layout may include background, font, frames, and lines within a brochure, and some layouts may be pre-determined to coordinate better with certain palettes.

The parts and blocks shown in FIGS. 1-3 are examples of parts that may comprise system 100, color measurement apparatus 200, and customized print apparatus 300 and do not limit the parts or modules that may be part of or connected to or associated with system 100 and apparatuses 200 and 300. For example, although imager 220, image analyzer 240, color corrector 260, and palette selector 280 are shown within box 200, one or more of these blocks may reside in different physical "boxes" or devices, and the connection(s) between them, e.g., connections 230, 250, and 270 may be wired or wireless, via physically close connections or over a network, or via a file transfer system, as described above with respect to connections 230 and 250. Thus, image analyzer 240, color corrector 260, and palette selector 280 could be in one "box" and imager 220 may be separate, or imager 220 and image analyzer 240 could be in one "box," or imager 220, image analyzer 240, and color corrector 260 could be in one "box" and palette selector 280 may be separate, or all four blocks could be in separate physical "boxes." As another example, although layout selector 310, color selector 320, and printer 330 are shown within box 300, their functions could be combined into a single conceptual box or these blocks may reside in different physical "boxes" or devices. Moreover, the layout, color, and artwork databases 312, 322, 324 could also be combined into a single database.

Figure 6A:
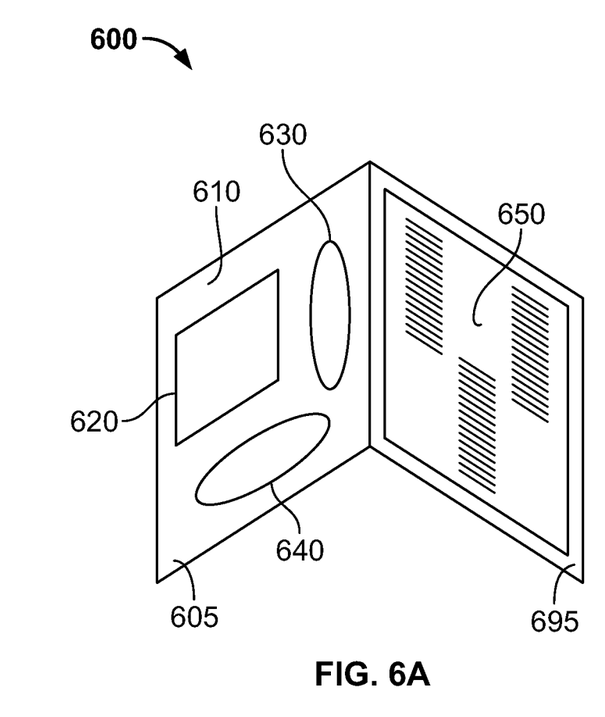
FIGS. 6A and 6B are conceptual illustrations of layouts according to embodiments of the invention.

Reference is now made to FIG. 6A, which is an example of a conceptual illustration of a layout 600. Layout 600 may include left-facing page 605 and right-facing page 695. Left-facing page 605 may include background 610 and frames 620, 630, 640, for example. Right-facing page 695 may include text (or "copy") 650, for example. Right-facing page 695 may also include a background, similar to or different from background 610. Background 610 may be a color or a pattern or a combination. Within frames 620, 630, 640 may be pictures or objects or color swatches or swatches from palette 15. The color samples may be corrected using the color measurement system calibrated by a print service provider (PSP) per system specifications.

Alternatively, a layout may present a scenario in outline form which a user may use to visualize the feature or object in various settings, such as a room, or with furniture, or with fashion options. An example, shown in FIG. 6B, of a layout 660 may present scenario 670 as a room setting that includes a vase 672, a table 674 on which the vase may sit, a rug 676 or flooring on which the table may be positioned, various wall coverings or curtains 678 surrounding the table, and possibly other furniture within the room. Other scenarios could be included in layout database 312, and the user can select the scenario in outline form based on the object or feature being matched.

Once the layout is selected, a color scheme for the brochure may be selected using color selector 320. Color selector 320 may use a color or paint database 322 and/or an artwork database 324 to provide colors and artwork to fill in the selected layout.

Figure 6B:
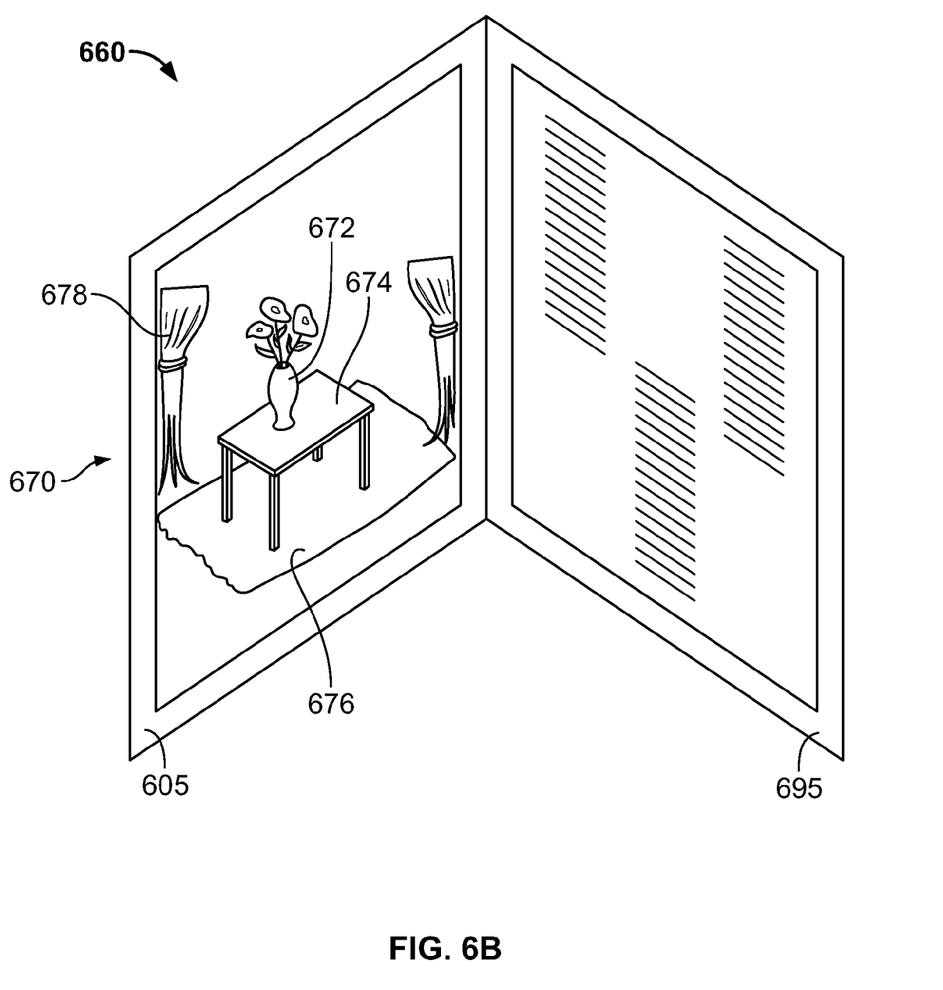

Returning to the example shown in FIG. 6B, the object being matched may be the flowers, the vase, the table, the rug, or the curtains. The user may indicate to customized print apparatus 300 which object (or feature, e.g., a leaf of the flower or the stem) is to be matched, and the system can insert the color measured by color measurement apparatus 100 for that object or feature. Customized print apparatus 300 can then present to the user the palette or palettes 15 selected by palette selector 280, and either the user or customized print apparatus 300 may choose colors for the rest of the objects and features in the scenario. The user may be able to cycle through a number of different colors, color combinations, palettes, and/or palette combinations in order to come up with a desired arrangement. Alternatively, color and artwork databases 322, 324 may include expert-approved arrangements that can be presented to the user to match the color of the object or feature of interest.

Figure 7:
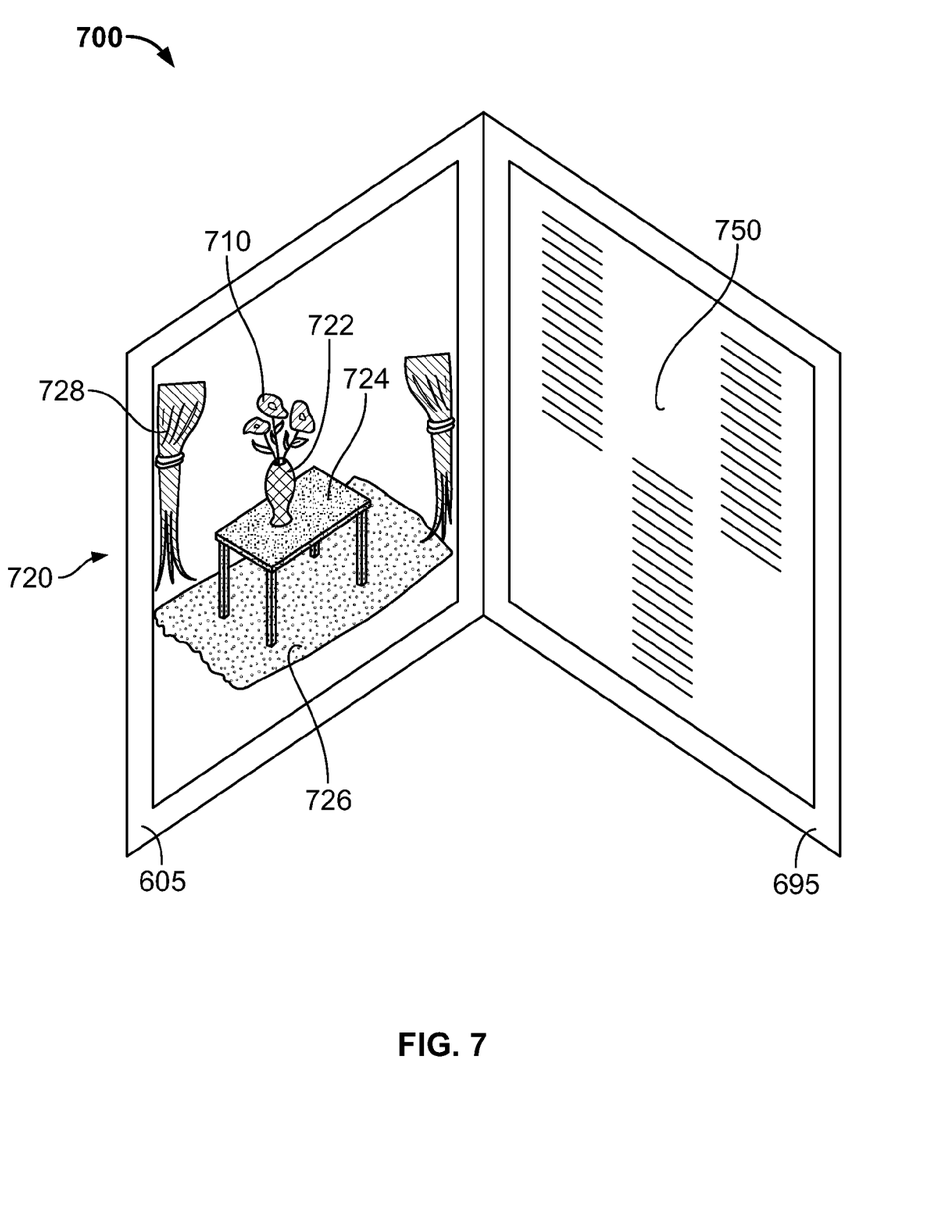
FIG. 7 is a conceptual illustration of a customized print or brochure according to embodiments of the invention.

A result of such choices is shown in customized print or brochure 700 in FIG. 7 as an embodiment of the present invention. In scenario 720, the flowers are the object/feature to be matched, and have been determined to have color 710. Based on that color, vase 672 has color 722, table 674 has color 724, rug 676 has color 726, and curtains 678 have color 728. To complete brochure 700, ad copy 750 may discuss the benefits of certain arrangements, may describe why the color schemes or combinations were selected based on the matched object or feature, and may inform the user where the colors or other objects in the layout may be purchased. Other ad copy 750 may include advertisements or marketing materials. The brochure may also include finishes (gloss or matte stock and/or varnish) on the features of interest or other objects in the layout to better simulate the end product result as measured or sampled with the matching palette. The brochure may also include a layout similar to layout 600 (see FIG. 6A), and include colors or finishes within frames 620, 630, 640.

Once the customized print is prepared as in FIGS. 6A, 6B, and 7, the document may be printed by printer 330. Printer 330 can be a single-function printer, a multi-function printer, a copier, a press, etc. Although printer 330 is shown in FIG. 3 inside of customized print apparatus 300, printer 330 could be a standalone printer connected to color selector 320 via a wired or wireless connection or have as an input a print file, that may be delivered via a storage medium such as a CD, DVD, thumb drive, or flash drive, or via a connection to a network, including the Internet. The printer should have the capability to render true colors so that the determined color of the object or feature of interest and the palette and other colors within the customized print are reliably reproduced.

Other scenarios and layouts can be contemplated for interior decoration, exterior decoration, apparel, and fashion. Interior decoration may include other rooms in a home or office, such as a bedroom, kitchen, basement, living room, foyer, conference room, lunch room, etc. Exterior decoration may include the outsides of homes or stores or buildings, including siding, roofing, landscaping, stonework, awnings, railings, etc. Apparel and fashion may include clothes, ensembles, shoes, accessories, hair, etc.

Figure 8:
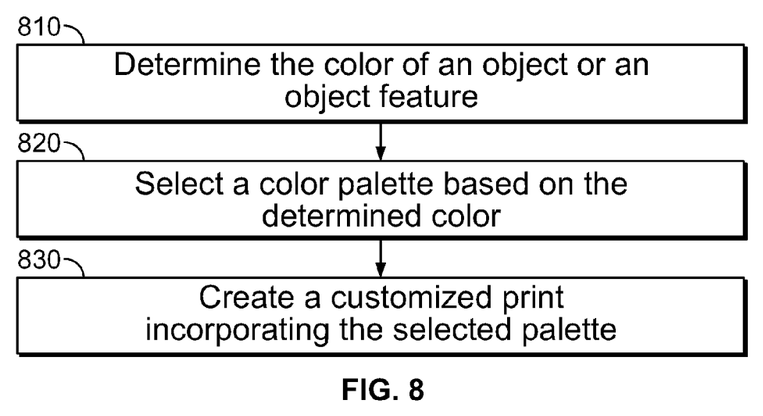
FIG. 8 is a flowchart illustrating a method for creating a customized print according to embodiments of the invention.

Reference is now made to FIG. 8, which is a flowchart illustrating the general process of system 100 according to embodiments of the invention. Such a process may determine the color of an object or of a feature in an object (operation 810). In operation 820, a color palette may be selected based on the determined feature color. In operation 830, a customized print or brochure is created incorporating the selected palette. Besides the operations shown in FIG. 8, other operations or series of operations may be used to select a color palette. Moreover, the actual order of the operations in the flowchart may not be critical.

Figure 9:
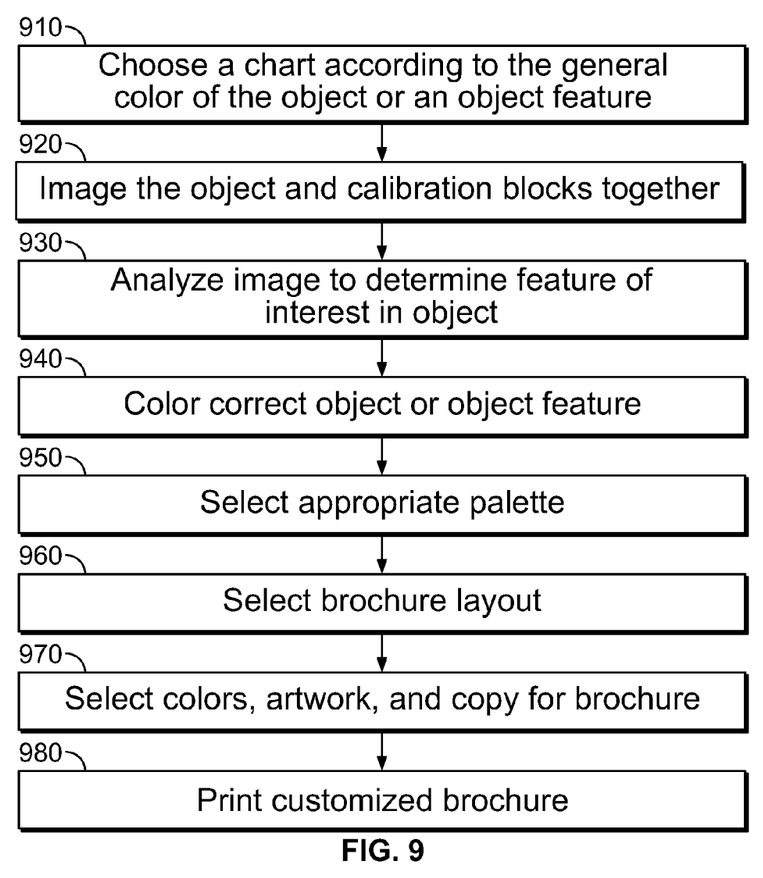
FIG. 9 is a flowchart illustrating operation of a customized print system according to embodiments of the invention.

FIG. 9 is a flowchart illustrating a more particular process of system 100 according to embodiments of the invention. A user may choose a chart according to the general color of the object or object feature to be matched (operation 910) and then image the object together with the chart having calibration patches (operation 920). (Operation 910 may not be needed if there is only one chart from which to choose.) In operation 930, the image may be analyzed to determine a feature of interest in the object whose color is desired to be matched. In some instances, there may be no image analysis, in which case the average color of the object itself may be matched. In operation 940, the color of the object or object feature may be determined or corrected, and in operation 950, an appropriate palette may be selected based on the determined or corrected color. In operation 960, a layout for the customized print or brochure may be selected, and in operation 970, colors and artwork for the brochure may be selected, as well as copy, such as ad copy. In operation 980, the customized brochure may be printed. Besides the operations shown in FIG. 9, other operations or series of operations may be used to select a color palette and generate a customized brochure. Moreover, the actual order of the operations in the flowchart may not be critical, thus selection of brochure layout may occur after selection of colors, artwork, and copy. More than one feature may have its color determined or corrected, and a separate brochure may be generated for each feature or one brochure may address multiple features.

Embodiments of the invention may be realized as a mobile phone or PDA application, which may perform one or more of the imaging, color correction, palette selection, and print preparation (e.g., layout generation) tasks, and may control a printing device to produce the customized print or brochure. Alternatively, the PDA or mobile phone may act as the imager and transmit the image over a network to another computer performing color correction, palette selection, print preparation, and print generation. Another embodiment could be resident on a website, and a user could image the object using imager 220, a digital camera, mobile phone, PDA, etc. and upload the image to the Internet to the website, which would perform the color correction, palette selection, print preparation, and print generation. Print generation could occur at the paint, furniture, or clothing store, for example, so that the user may pick up the customized print at the store. Other embodiments could include a kiosk within the store, including a camera configured to transmit images to a computer for color correction, palette selection, and print preparation, and a printer can generate the print. In any of these embodiments, a digital press could be used as the printer for providing high-speed, high-quality, low-volume color prints, which may enhance the desirability of the customization. Moreover, because printers often have a processor, such a printer could also perform the color correction, palette selection, and print preparation.

In sum, a system and method are described that may be used to determine a color in an image, select a color palette based on that determined or corrected color, and generate a customized print or brochure based on that palette. Embodiments may be used in interior and exterior decoration, fashion, apparel, and other applications. The method may include imaging an object with a reference color chart, analyzing the image to determine an object feature whose color may be corrected, correcting the color of the feature, and selecting the color palette. Generating a customized print may involve preparing the print by selecting a layout and using the color palette to select colors, artwork, and copy for the print, and then printing the customized print using a printer.

An advantage of these embodiments is the ability to provide in situ color measurement related to product recommendations provided through custom printed brochures. Currently, there is very little chance that a custom brochure will accidentally relate to a consumer's decoration or fashion situation. Embodiments of the invention increase the relevance of the brochure to the target consumer, improving the efficacy of printed marketing materials. This supports one-to-one marketing, not based on demographics, but based on the actual color and decoration or fashion needs of the consumer.

Embodiments of the invention also support the democratization of access to expert consultation and know-how. Paint companies and other in the décor industry lack an ability to effectively market these to buyers because there is a gap between the desire to decorate and the ability to select colors. Through in situ color assessment and custom brochures, embodiments of the invention can close this gap providing expert-tailored advice to ensure that the consumer can buy with confidence. This will result in more uses of custom color printing applications for use in one-to-one marketing, which may increase reliance on short-run digital printing presses and press runs.

Aspects of the present invention may be embodied in the form of a system, a method, or a computer program product. Similarly, aspects of the present invention may be embodied as hardware, software or a combination of both. Aspects of the present invention may be embodied as a computer program product saved on one or more non-transitory computer readable media in the form of computer readable program code embodied thereon.

For example, the non-transitory computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:

1. A method for producing a customized print, comprising:
capturing, by an imaging device, an image of a physical scene including a physical object and a selected physical reference color chart of a plurality of physical reference color charts, each physical reference color chart having a plurality of color patches that each correspond to a same general hue, the same general hue of the colors patches of selected physical reference color chart matching a color of interest of the physical object;
correcting, by a processing device, a color value of at least one feature of the physical object using the imaged physical object and the imaged selected physical reference color chart;
selecting, by the processing device, a color palette based on the at least one corrected color value; and
generating, by a printing device a print based on the selected color palette.

2. The method of claim 1, wherein the selecting comprises substantially matching the at least one corrected feature color to a color in a database containing palette groupings.

3. The method of claim 1, wherein said print is used in decorating.

4. The method of claim 1, wherein said print is used in fashion or apparel.

5. The method of claim 1, wherein said physical reference color chart is one of a plurality of physical reference color charts chosen by a user.

6. The method of claim 1, wherein the selected physical reference color chart has a cutout area in a center thereof surround by the color patches, the captured image comprising the selected physical reference color chart in which the physical object is visibly positioned within the cutout area.

7. A non-transitory computer-readable medium having computer-readable program code embodied therein for performing a method comprising:
capturing an image of a physical scene including a physical object and a selected physical reference color chart of a plurality of physical reference color charts, each physical reference color chart having a plurality of color patches that each correspond to a same general hue, the same general hue of the colors patches of selected physical reference color chart matching a color of interest of the physical object;
correcting a color value of at least one feature of the physical object using the imaged physical object and the imaged selected physical reference color chart;
selecting a color palette based on the at least one corrected color value; and
generating a print based on the selected color palette.

8. A system for producing a customized print, comprising:
a color measurement apparatus for determining a color of at least one feature of physical object, said physical object imaged with a selected physical reference color of a plurality of physical reference color charts, each physical reference color chart having a plurality of color patches that each correspond to a same general hue, the same general hue of the colors patches of selected physical reference color chart matching a color of interest of the physical object, for correcting a color value of at least one feature of the physical object using the imaged physical object and the imaged selected physical reference color chart, and for selecting a color palette based on the at least one corrected color value; and
a customized print apparatus for generating a print based on the selected color palette.

9. The system of claim 8, wherein said color measurement apparatus includes an image analyzer for analyzing the image of the object and the reference color chart and providing at least one feature whose color may be determined.

10. The system of claim 8, wherein said color measurement apparatus includes a color corrector and a palette selector.

11. The system of claim 10, wherein said palette selector matches the at least one determined feature color to a finish in a database.

12. The system of claim 11, wherein said finishes in the database are included in at least one color palette.

13. The system of claim 12, wherein said selected color palette is the color palette including the finish in the database matching the at least one determined feature color.

14. The system of claim 8, wherein the image of the object and the reference color chart is received over a network.

15. The system of claim 8, wherein said customized print apparatus includes a digital press.

16. The system of claim 8, further comprising an imaging apparatus for generating the image of the object and the reference color chart.

17. The system of claim 16, wherein the color measurement apparatus comprises the imaging apparatus.

18. The system of claim 16, wherein said system resides as at least part of a mobile phone or computer application.

* * * * *